US010675639B2

(12) United States Patent
Clavaguera et al.

(10) Patent No.: US 10,675,639 B2
(45) Date of Patent: Jun. 9, 2020

(54) DEVICE FOR COLLECTING PARTICLES CONTAINED IN AN AEROSOL, COMPRISING ELECTROMETRES TO DETERMINE NANOPARTICLE CONCENTRATION AND PARTICLE SIZE

(71) Applicant: COMMISSARIAT A L'ENERGIE ATOMIQUE ET AUX ENERGIES ALTERNATIVES, Paris (FR)

(72) Inventors: Simon Clavaguera, Grenoble (FR); Michel Pourprix, Montlhery (FR); Quentin Renot, La Milesse (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 220 days.

(21) Appl. No.: 15/744,291

(22) PCT Filed: Jul. 28, 2016

(86) PCT No.: PCT/EP2016/068000
§ 371 (c)(1),
(2) Date: Jan. 12, 2018

(87) PCT Pub. No.: WO2017/017183
PCT Pub. Date: Feb. 2, 2017

(65) Prior Publication Data
US 2018/0200726 A1    Jul. 19, 2018

(30) Foreign Application Priority Data

Jul. 28, 2015   (FR) .................................. 15 57223

(51) Int. Cl.
*B03C 3/02*        (2006.01)
*H01J 49/22*       (2006.01)
(Continued)

(52) U.S. Cl.
CPC .............. *B03C 3/025* (2013.01); *B03C 3/017* (2013.01); *B03C 3/06* (2013.01); *B03C 3/09* (2013.01);
(Continued)

(58) Field of Classification Search
CPC ................................. B03C 3/025; H01J 49/22
See application file for complete search history.

(56) References Cited

U.S. PATENT DOCUMENTS 5,098,657 A    3/1992   Blackford et al.
6,200,539 B1   3/2001   Sherman et al.
(Continued)

FOREIGN PATENT DOCUMENTS

EP    2 853 882 A1    4/2015

OTHER PUBLICATIONS

W. Hinds, "Aerosol Technology", John C. Wiley and Sons, 2nd Edition, 1999, pp. 223, 330, 341.
(Continued)

*Primary Examiner* — Robert A Hopkins
(74) *Attorney, Agent, or Firm* — Pearne & Gordon LLP

(57) ABSTRACT

The invention relates to a method and device for collecting nanoparticles which may be present in an aerosol. The invention consists of electrostatically collecting nanoparticles contained in an aerosol by a mechanism of particle charging by unipolar ion diffusion, followed by the application of a field without a corona effect, which makes it possible to deposit the particles in concentric rings on different parts of a single flat substrate oriented orthogonally to the aerosol circulation direction. The biggest particles are deposited towards the centre of the flat substrate and the finest particles towards the periphery of the flat substrate. The invention also relates to a method of operation and to
(Continued)

the use of such a device for evaluating the exposure of workers or consumers to nanoparticles.

14 Claims, 9 Drawing Sheets

(51) Int. Cl.
| | |
|---|---|
| B03C 3/12 | (2006.01) |
| B03C 3/36 | (2006.01) |
| B03C 3/41 | (2006.01) |
| B03C 3/47 | (2006.01) |
| G01N 15/02 | (2006.01) |
| G01N 15/06 | (2006.01) |
| B03C 3/017 | (2006.01) |
| B03C 3/09 | (2006.01) |
| B03C 3/06 | (2006.01) |
| B03C 3/49 | (2006.01) |
| G01N 15/00 | (2006.01) |
| B03C 3/38 | (2006.01) |

(52) U.S. Cl.
CPC .............. *B03C 3/12* (2013.01); *B03C 3/368* (2013.01); *B03C 3/41* (2013.01); *B03C 3/47* (2013.01); *B03C 3/49* (2013.01); *G01N 15/0205* (2013.01); *G01N 15/0266* (2013.01); *G01N 15/0612* (2013.01); *G01N 15/0656* (2013.01); *H01J 49/22* (2013.01); *B03C 3/38* (2013.01); *B03C 2201/04* (2013.01); *G01N 2015/0038* (2013.01); *G01N 2015/0046* (2013.01)

(56) References Cited

U.S. PATENT DOCUMENTS

| | | | |
|---|---|---|---|
| 7,549,318 B2 | 6/2009 | Burtscher et al. | |
| 8,044,350 B2 | 10/2011 | Chen et al. | |
| 8,348,626 B2 | 1/2013 | Roy | |
| 8,779,382 B1* | 7/2014 | Tsai | H01T 23/00 250/426 |
| 2003/0136205 A1 | 7/2003 | Totoki | |
| 2004/0231439 A1 | 11/2004 | Totoki | |
| 2005/0126260 A1 | 6/2005 | Totoki | |
| 2010/0043527 A1 | 2/2010 | Marra | |
| 2015/0040760 A1 | 2/2015 | Braden et al. | |
| 2015/0102822 A1 | 4/2015 | Okuda | |

OTHER PUBLICATIONS

P. Intra and N. Tippayawong, "Aerosol and Air Quality Research", Taiwan Association for Aerosol Research, 2011, pp. 187-209.
G.W. Hewitt, "The Charging of Small Particles for Electrostatic Precipitation", AIEE Trans., 76: pp. 300-306, Jul. 1957.
G. Biskos, K. Reavell, N. Collings, "Electrostatic Characterization of Corona-Wire Aerosol Chargers", J. Electrostat., 53: 69-82, 2005.
D.Y.H. Pui, S. Fruin, P.H. McMurry, "Unipolar Diffusion Charging of Ultrafine Aerosols", Aerosol Sciences Technology, 8: 173-187, 1988.
French Preliminary Search Report from Corresponding French Application No. FR1557223 dated Jun. 17, 2016.
International Search Report for corresponding International Application No. PCT/EP2016/068000 dated Oct. 7, 2016.
Written Opinion for corresponding International Application No. PCT/EP2016/068000 dated Oct. 7, 2016.
TSI Inc., Nanoscan SMPS Nanoparticle Sizer Model 3910, Brochure, 2012 (cited on p. 4 of the specification).
TSI, Inc., Aerosol Electrometer, Model 3068B, Brochure, 2015 (cited on p. 4 of the specification).

\* cited by examiner

Fig.1

Entrée Aérosol

Sortie Aérosol

Fig.2

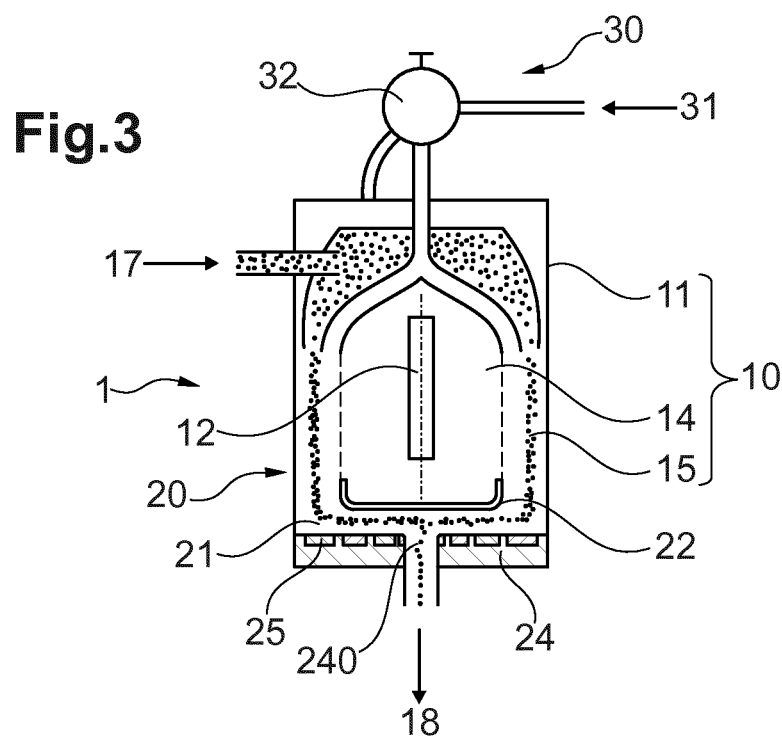
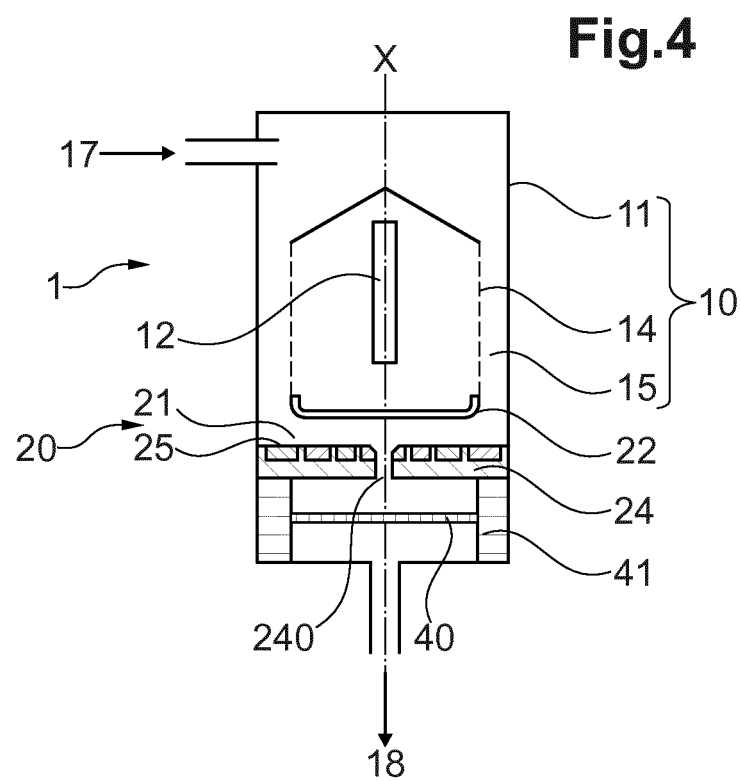

DEVICE FOR COLLECTING PARTICLES CONTAINED IN AN AEROSOL, COMPRISING ELECTROMETRES TO DETERMINE NANOPARTICLE CONCENTRATION AND PARTICLE SIZE

TECHNICAL FIELD

The present invention relates to the field of collecting and analyzing nanoparticles likely to be in suspension in an aerosol.

The aim of the present invention is to allow collection of nanoparticles in suspension in aerosols that is simultaneous but selective as a function of their dimensions, with the selectivity preferably intended to collect by separating nanometric-sized particles by size in order to determine their concentration and their particle size.

"Nanoparticle" is understood in terms of the standard definition according to standard ISO TS/27687: a nano-object, the three dimensions of which are on the nanometric scale, i.e. a particle with a nominal diameter that is less than approximately 100 nm.

Even though it is described with reference to the collection of nanoparticles, the invention also allows downstream processing of the other bigger particles.

PRIOR ART

Since the 1970s, awareness of the environmental and health implications caused by aerosols has been the source of new technological developments in order to better evaluate the associated risks.

The field rapidly expanded in the 1980s to include the use of aerosols in high-technology production methods and the control of aerosol contamination in ultraclean atmospheres.

From the 1990s, research intensified on the properties of ultrafine particles, i.e. those smaller than 100 nm, and on the effect of aerosols on the climate. The field is therefore very broad, since it simultaneously covers the fields of industrial hygiene, of air pollution control, of inhalation toxicology, of atmospheric physics and chemistry and of radioactive aerosol contamination in installations or in the environment.

More recently, the rapid growth of nanotechnologies in various fields, such as health, microelectronics, energy technologies or everyday consumer products such as paints and cosmetics, means that it is crucial for work to continue on the health and environmental implications of these new materials in order to ensure optimal safety conditions.

Therefore, methods and tools need to be developed for evaluating the exposure of workers, consumers and the environment to particles, and particularly to nanoparticles.

The development of methods and devices for sampling and analyzing aerosols over a wide range of particle sizes, up to nanometric-sized particles, is thus a critical issue in terms of public health and of the prevention of the associated risks.

In particular, the development of sampling devices adapted to be portable and to be fixed as a unit to a worksuit of a worker on a nano-objects manufacturing station, the development or the use of nanomaterials could prove to be essential.

Numerous devices exist for sampling and collecting particles in suspension in aerosols with a view to analyzing them in situ or in a laboratory. They may implement collection by filtration on fibers or on porous membranes, collection by diffusion for the finest particles, collection under the effect of a field of inertia (impactors, cyclones, centrifuges) or gravity (sedimentation chambers, elutriators) forces for the biggest particles, or even collection under the effect of a field of electric, thermal or radiation forces.

Among these devices, those which are electrostatic, i.e. the operating principle of which is based on implementing an electric field, particularly an intense electric field for creating a corona discharge effect, are commonly used.

When an intense electric field is generated in a volume where aerosol particles are present, said particles may electrically charge through two distinct charging mechanisms and this may occur concurrently.

Publication [1], particularly FIG. 15.4 on page 330 of this publication, shows that the mechanism for electric charging by unipolar ion diffusion, associated with the mechanism for electric field charging, is applicable to a wide range of particle sizes, at least for particles with dimensions between 0.01 and 10 µm. It is also clear that the mechanism for electric charging by unipolar ion diffusion is especially predominant for the finest particles, typically the nanoparticles, i.e. those smaller than 100 nm. By contrast, the field charging mechanism is more efficient for the big particles, i.e. the micron-sized and sub-micron-sized particles (≥300 nm).

The mechanism for charging by unipolar ion diffusion is thus predominantly applicable to the finest particles. This mechanism is increasingly implemented in nanoparticle metrology, particularly for determining their particle size. Indeed, many authors have studied and continue to study devices capable of providing the finest particles with high electrical mobilities, in order to be able to select them in instruments adapted to this new field. In particular, article [2] may be cited to this end, which reviews most of the technologies developed to date, or even the principle developed by the author of publication [3], which uses a wire-cylinder configuration, which has been widely studied more recently, as shown in publication [4], but also previously (publication [5]).

FIG. 1 is a schematic representation of a charging device, also called charger, for unipolar ion diffusion, the geometry of which is of the wire-cylinder type, as shown in publication [4]. The charger 10 comprises a body 1 with rotational symmetry in two parts that support a hollow metal cylinder 11 forming an external electrode connected to an alternating current power supply and a central metal wire 12 arranged along the axis of the body and connected to a high-voltage power supply, not shown. A cylindrical gate 14 forming an internal electrode is also annularly arranged around the central wire 12. The aerosol containing the particles to be charged circulates in the charger 10, from the inlet orifice 17 to the outlet orifice 18, by passing through the space 15 that is delimited between the internal electrode 14 formed by the gate and the external electrode 11 formed by the cylinder.

This charger 10 operates as follows: ion are produced by a corona effect on the central wire 12 and are collected by the gated internal electrode 14 taken to a low potential, typically to ground. Part of these ion exits this gate 14 to proceed toward the internal surface of the peripheral cylinder 11 due to the voltage applied thereto. The aerosol particles pass through the space 15 between the gate 14 and the cylinder 11 and are thus charged by diffusion by the unipolar ion that exited the gate 14. The diffusion charging mechanism operates as a function of the product N*t, where N represents the concentration of unipolar ion and t represents the residence time of the particles. The diffusion charging mechanism is the only mechanism that is able to produce as it is not possible to have a field charging mechanism since the electric field is very weak in the space 15.

It is worthwhile noting that the process for charging aerosols by unipolar ion diffusion allows a given number of electric charges to be imparted to a particle of given size.

Therefore, the sorting or, in other words, the selection of particles may occur according to their electrical mobility, i.e. according to their size.

This principle is also implemented in an electrical differential mobility analyzer (DMA), which is an instrument capable of providing particle size distribution of fine particles by counting the concentration of particles in a given electrical mobility classification. Counting may be performed using a Condensation Particle Counter (CPC), which is the most conventional method.

A DMA coupled to a CPC forms an instrument that is generally known as electrical mobility spectrometer or SMPS (Scanning Mobility Particle Sizer). SMPSs are already widely marketed by companies such as PALAS, GRIMM or TSI. The operating principle of such an instrument is thus as follows:
  varying the high voltage on the electrode of the DMA, i.e. by scanning;
  analyzing the response of the CPC for each obtained voltage value, by processing the signal by applying a deconvolution in order to reach the size range of the incident particles, knowing the charging law of these particles.
  It is to be noted that this instrument may only operate correctly if the concentration of incident particles is stable enough upstream throughout the entire scanning period.

The weight and the bulkiness of such devices can be reduced to make them portable and autonomous, such as, for example, the instrument marketed by TSI under the name "NanoScan-SMPS Model 3910".

In certain configurations, a CPC may be replaced by an electrometer connected to a Faraday cup. This allows very weak electric currents to be measured, of approximately 1 femtoampere (fA). The electric current i detected by the electrometer is proportional to the concentration of particles N carrying an electric charge according to the following relation:

$$i = Q*N*e,$$

where e is the elementary charge ($1.6*10^{-19}$ C) and Q is the volume flow of the particles exiting the DMA and entering the Faraday cup. For example, the instrument marketed by TSI under the name "NanoScan-SMPS Model 3068B" implements such a device.

More integrated devices have been developed by providing, inside an axial flow DMA, a plurality of collection electrodes arranged downstream of each other and each connected to an electrometer, which allows constant high-voltage operation on the internal electrode, and thus without scanning, and thus allows measurement of particle concentrations that may quickly vary. The instrument marketed by TSI under the name "NanoScan-SMPS Model 3090" implements such a device.

Other electrometer detection devices have been proposed recently, above all with the aim of offering miniaturization.

Thus, U.S. Pat. No. 7,549,318 B2 discloses a device in which the particles are first electrically charged by unipolar ion diffusion and are then collected, with the current that is measured by three electrometers placed one after the other, the last of which is connected to a Faraday cup, allowing the concentration and the average diameter of the particles to be determined.

Another device is implemented in U.S. Pat. No. 8,044,350 B2. This patent discloses a device in which the particles are first electrically charged by a unipolar ion diffusion charger and are then selected in an electrostatic precipitator in the form of a disk arranged downstream of the charger, by varying the applied high voltage, i.e. by performing voltage scanning. The current measured by an electrometer connected to the precipitator allows the concentration and the particle size of the particles to be determined.

It is clear from studying the prior art that a device has not been proposed that allows both the simultaneous collection of the nanoparticles present in an aerosol, and which differ in size, and their separation into size ranges in order to allow their subsequent analysis in order to determine their concentration, their physico-chemical composition and/or their morphology as a function of their size range.

Indeed, on the one hand, by definition, the aforementioned DMA instruments coupled to CPCs do not deposit sorted particles that thus cannot undergo a physico-chemical analysis and, on the other hand, those instruments provided with one or more electrometer(s) are not designed with collection zones for a subsequent physico-chemical analysis of the collected nanoparticles and also with a geometry that is adapted to portable use.

A requirement therefore exists for a device that allows both the simultaneous collection of the nanoparticles present in an aerosol, and which differ in size, and their separation according to size ranges, particularly in order to allow the subsequent analysis of the collected and separated nanoparticles in order to determine their concentration and their chemical composition sequentially as a function of their size range.

The general aim of the invention is thus to at least partially meet this need.

DISCLOSURE OF THE INVENTION

To this end, the initial object of the invention is a device for collecting nanoparticles likely to be present in an aerosol, comprising:
  a conduit in the form of a hollow cylinder for rotating about a longitudinal axis (X), the conduit comprising an inlet orifice and an outlet orifice, between which the aerosol may circulate;
  suction means for circulating the aerosol from the inlet orifice to the outlet orifice;
  a unipolar ion diffusion charger, downstream of the inlet orifice, comprising an electrode in the form of a wire that extends along the axis (X) and is surrounded by an electrode in the form of a gate, the charger being adapted to charge the nanoparticles in the space separating the gate from a conducting portion of the internal wall of the conduit by diffusing unipolar ion through the gate;
  an electrode, called field electrode, downstream of the diffusion charger, which electrode is in the form of a circular plate that extends orthogonal to the axis (X), and at least one flat substrate, parallel to the field electrode, perforated in its central part with a through opening, and comprising various concentric rings around the through opening individually connected to at least one electrometer;
  the potential difference applied between the field electrode and the substrate being adapted to generate an electric field without a corona effect in the space that separates them and thus, on the one hand, to allow particles bigger than nanoparticles to pass through the through opening and, on the other hand, to collect the nanoparticles previously charged by the diffusion charger by deposition onto a collection zone of the flat substrate defined by the various rings.

Therefore, the invention consists in electrostatically collecting nanoparticles present in an aerosol with a mechanism for unipolar ion diffusion charging, then applying a field without a corona effect, which allows them to be deposited in concentric rings at different locations of one and the same flat substrate arranged orthogonal to the aerosol circulation direction. The biggest particles are deposited toward the center of the flat substrate and the finest particles are deposited on the periphery.

Particles present in the aerosol that are bigger than the nanoparticles are extracted through the through opening at the center of the flat substrate.

The electrometers individually connected to the concentric rings of the flat collection substrate allow the concentration and the particle size to be obtained for the nanoparticles deposited thereon through deconvolution processing of the electrical signals.

The flat substrate onto which the nanoparticles are deposited is mounted in a detachable manner. After a given sampling time, the deposited nanoparticles then may be analyzed using conventional physical or physico-chemical characterization techniques, such as optical or electron microscopy, surface scanner, X-ray fluorescence (XRF) spectroscopy, micro-X-ray fluorescence (µ-XRF), laser-induced breakdown spectroscopy (LIBS), etc.

Among these analysis techniques, those with spatial resolution are particularly adapted for analyzing the one or more collection substrate(s) of the device according to the invention. Very particularly, the µ-XRF, LIES and even µ-LIBS techniques appear to be the methods of choice for determining the chemical composition of nanoparticles collected in concentric rings.

As previously mentioned, the nanoparticles with the lowest mass will be distributed over a wider circumference than the biggest nanoparticles that contribute notably more to the mass. This directly results in a surface density in species of interest that is considerably different from the center to the periphery. As an initial approach, a person skilled in the art may consider this observation to be a technical problem to be overcome for applying spatial resolution analysis techniques such as LIES, the resolution of which reaches values of approximately 100 µm. However, the inventors have shown that an LIES technique allows the spectra to be totaled for the same classification of nanoparticles, the size classification in this case, in order to improve the signal-to-noise ratio the greater the circumference. Therefore, the device according to the invention may allow quantitative information to be gathered on the chemical composition of the nanoparticles despite the high surface density gradient that exists between the center of the flat collection substrate and its periphery.

The number of concentric rings connected to electrometers depends on the desired precision for determining the particle size distribution of the nanoparticles.

Four concentric rings may prove to be sufficient for the contemplated applications, particularly for determining the particle size distribution of nanoparticles likely to be inhaled by operators on their workstations. In essence, the analysis technique is not a hindrance since a standard LIES analysis with resolutions of 100 µm would allow up to approximately one hundred concentric rings to be distinguished. However, the electronics associated with measuring very weak currents in the device according to the invention are decisive for the development of a portable device. Therefore, four rings seem to be a good compromise.

A collection device according to the invention is particularly well adapted for sampling nanoparticles in gaseous environments, particularly the air in premises or in the environment, in order to determine the concentration, the particle size, the chemical composition and/or the morphology of the aerosol nanoparticles likely to be inhaled.

The collection device according to the invention may comprise a detector with a real-time alarm function in the event that a predetermined threshold is exceeded.

The device according to the present invention thus allows evaluation of the individual exposure of operators in their work areas where manufactured nanoparticles are released, with real-time monitoring of the signal of the number of nanoparticles, a posteriori of their chemical composition in order to dispense with other particles incidentally present in the aerosol, and also with size-related sorting of the nanoparticles collected on the substrate, in order to be able to at least partly distinguish the fractions that are most relevant with respect to health and regulations.

According to an advantageous embodiment, the device further comprises a system adapted to allow the aerosol flow circulating in the space separating the gate from the internal wall of the conduit to be enveloped between two laminar flows of filtered air.

Downstream of the through opening of the collection substrate, the device according to the invention advantageously may comprise:
  a filter, preferably in the form of a filtering membrane, adapted to retain the particles having passed through the through opening, the filter being able to be connected to an electrometer;
  an element consisting in a disk supporting a tip connected to a high-voltage power supply for creating a corona discharge, so as to collect, on the lower face of the substrate, the particles having passed through the through opening, by means of an electric collection field imposed between the substrate and the disk;
  a trap in the form of a disk perforated with a blind hole interposed below the opening, so as to collect by inertial impaction, according to a given size range, part of the particles having passed through the through opening.

A plurality of variants may be provided for the trap.

Therefore, according to a first variant, the lips of the blind hole are in the form of a host of tips arranged in a circular manner or of a blade with a tapered edge, the disk being connected to a high-voltage power supply to create a corona discharge in the space between the lower face of the substrate and the lips of the blind hole so as to collect, according to a given size range, only part of the particles having passed through the through opening, preferably particles with dimensions between 0.1 and 4 µm.

The suction means may be formed by a pump or a fan.

Alternately, the suction means may be at least partly formed by plasma actuators.

One or more of the advantageous features as follows may be provided:
  the field electrode is connected to a high-voltage power supply, preferably between 2 and 6 kV;
  the gate is connected to a low-voltage power supply, preferably of approximately 100 V;
  the flat substrate is connected at zero potential.

A further object of the invention is a method for operating a collection device as previously described, comprising a step of emitting an alarm in the event that a predetermined threshold value is exceeded that is measured using the one or more electrometer(s) connected to the concentric rings integrated in the collection substrate.

Finally, an object of the invention is various uses of a device as previously described, either for collecting and at the same time classifying nanoparticles with different dimensions, or for evaluating the individual exposure of workers or of consumers to the nanoparticles or even for determining a particle size distribution of an aerosol containing a nanoparticulate fraction.

DETAILED DESCRIPTION

Further advantages and features will become more clearly apparent upon reading the detailed description, which is provided by way of a non-limiting illustration, with reference to the following figures, among which:

FIG. 1 is a longitudinal section view of a charging device or a unipolar ion diffusion charger;

FIG. 2 is a schematic longitudinal section view of an example of a nanoparticle collection device according to the invention;

FIG. 3 is a schematic longitudinal section view of a first variant of the device according to FIG. 2;

FIG. 4 is a schematic longitudinal section view of an advantageous embodiment of the device according to FIG. 2;

Figure 11:
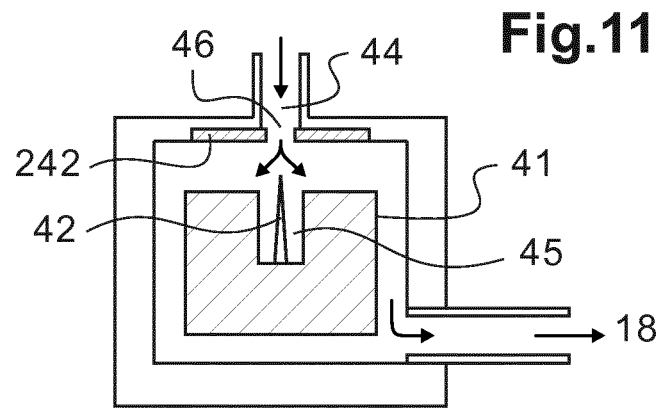
FIG. 11 is a detailed schematic view of the lower part of the device according to FIG. 10, on which finite elements computation simulations have been undertaken.
Figure 12:
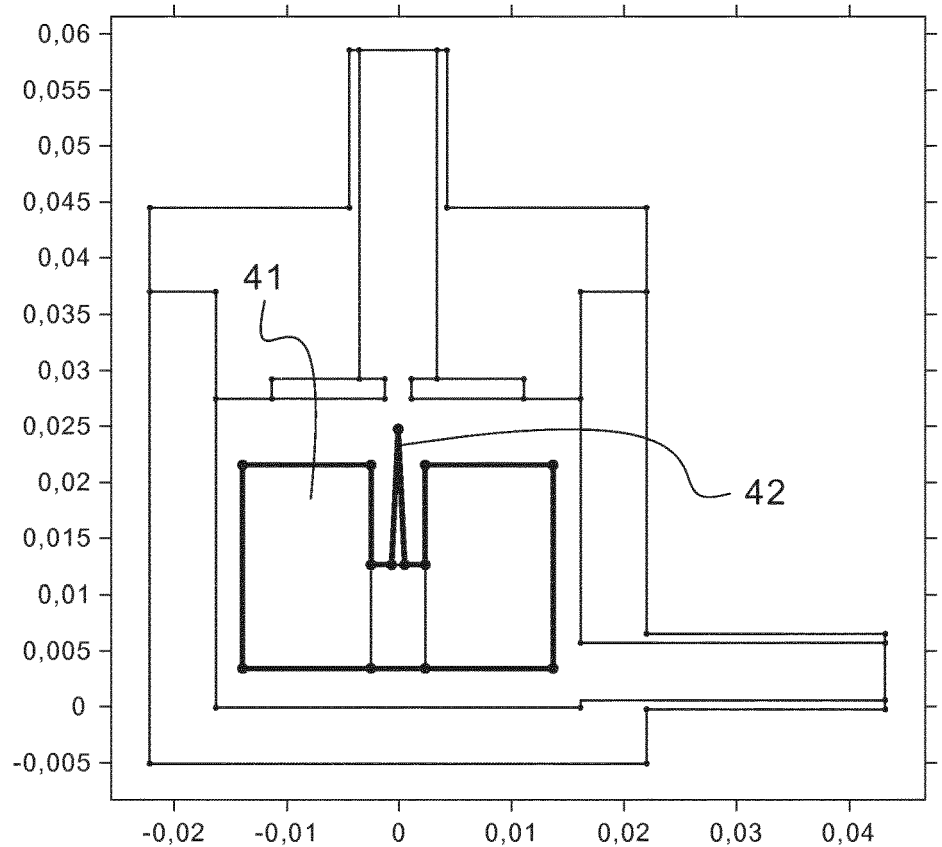
Figure 13:
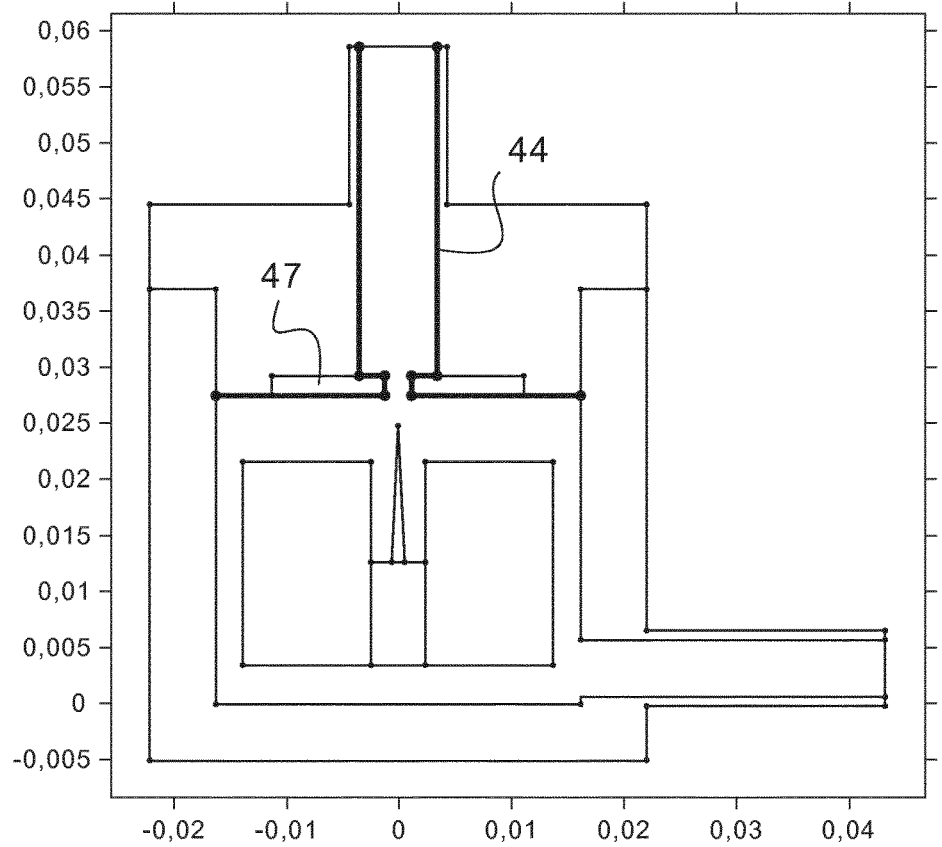
Figure 14:
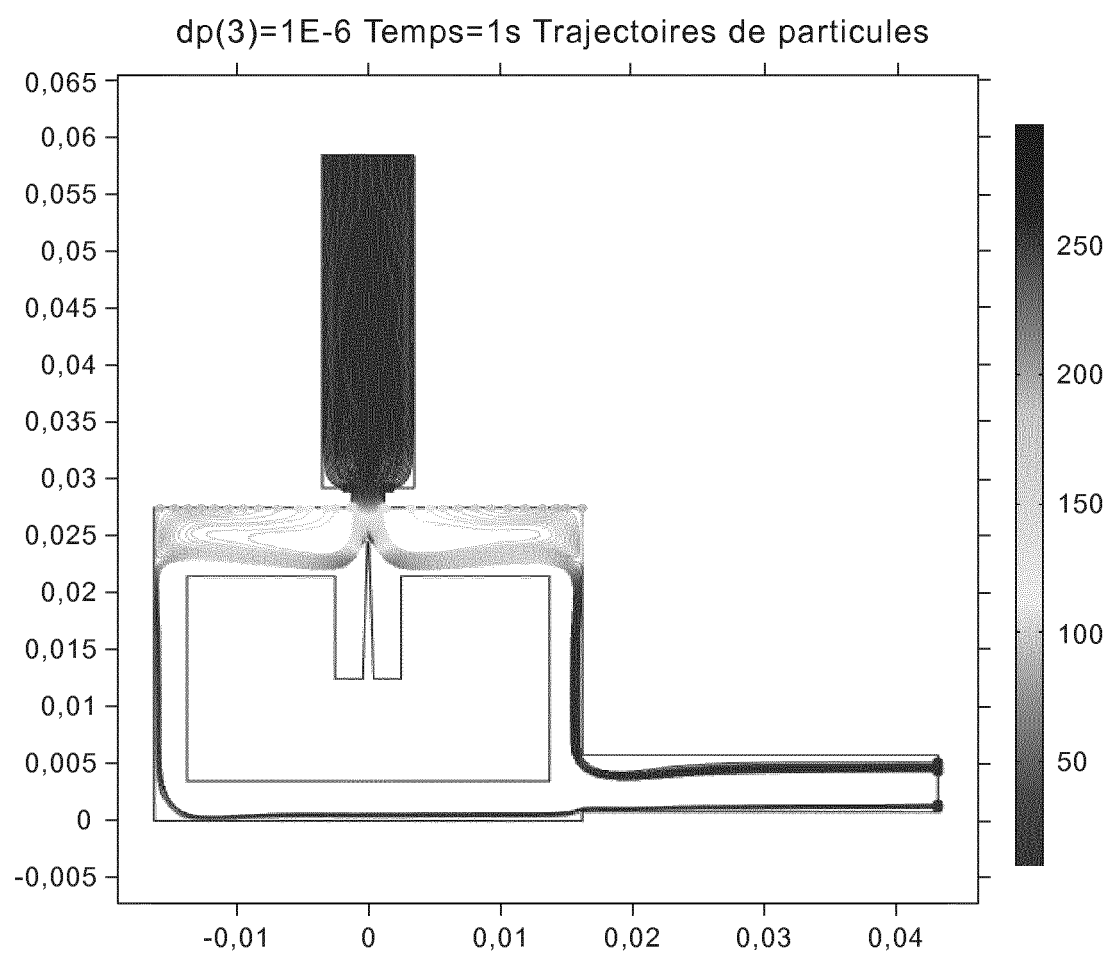
Figure 15:
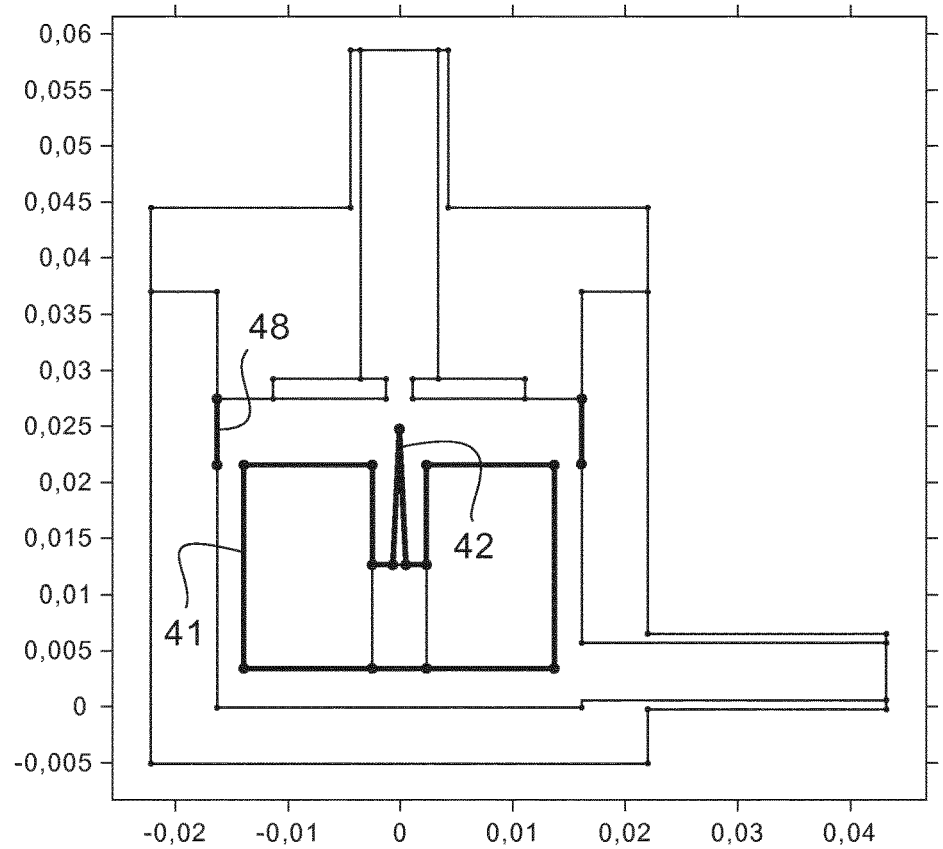
Figure 16:
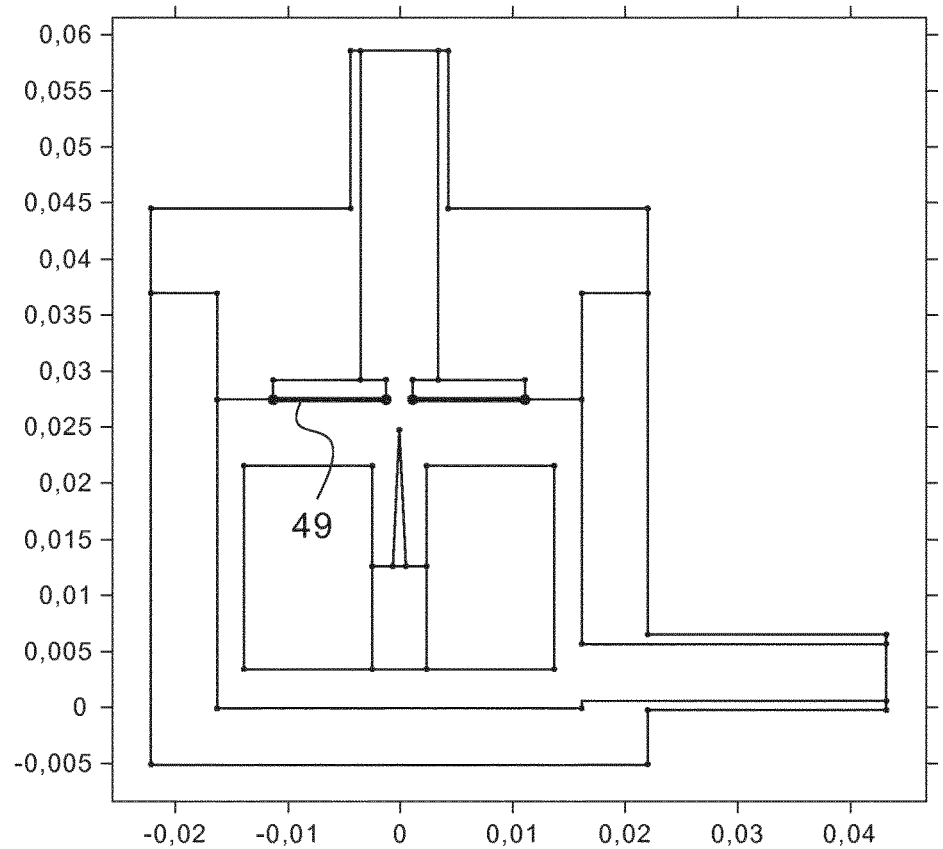

FIGS. 12 and 13 reproduce FIG. 11 and show the electric and ground potentials of the various elements of the part of the device according to a first configuration for finite elements computation simulation;

FIG. 14 is a view originating from the simulation by the finite elements computation software for determining the speed profiles of 1 μm particles at a flow rate of 1 L/min, as well as their trajectories in a device according to the invention as shown in FIG. 11;

FIGS. 15 and 16 reproduce FIG. 11 and show the electric and ground potentials of the various elements of the part of the device according to a second configuration for finite elements computation simulation.

Throughout the present application, the terms "vertical", "lower", "upper", "low", "high", "below", "above", "height" are to be understood with reference to a collection device arranged vertically with the inlet orifice at the top.

Similarly, the terms "inlet", "outlet", "upstream" and "downstream" are to be understood with reference to the direction of the suction flow through a collection device according to the invention. Therefore, the inlet orifice denotes the orifice of the device through which the aerosol containing the particles is sucked, whereas the outlet orifice denotes the orifice through which the air flow exits.

For the sake of clarity, a reference numeral denoting the same element of a collection device is identical in any one of FIGS. 1 to 16.

Figures 1, 2:
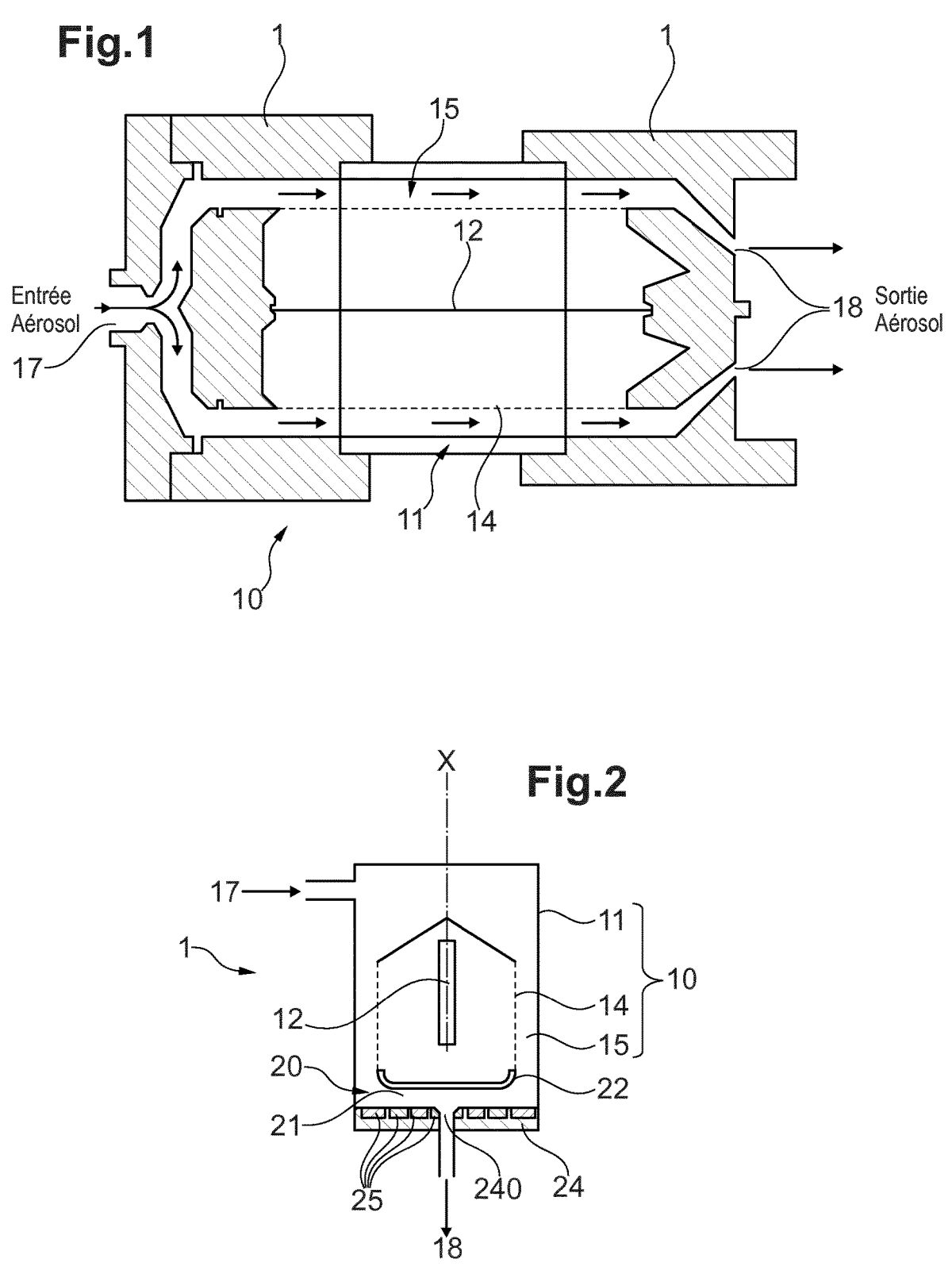

FIG. 1 has already been described in the preamble. Therefore, it is not described hereafter.

For the sake of clarity, the same elements of the collection devices according to the prior art and according to the illustrated examples of the invention are denoted using the same reference numerals.

FIG. 2 shows an example of an electrostatic device 1 according to the invention for selectively collecting nanoparticles likely to be contained in an aerosol.

Such a device according to the invention allows the nanoparticles to be collected and separated according to size ranges.

The collection device 1 first comprises a conduit 11, which is a hollow cylinder for rotating about the longitudinal axis X and which is electrically connected at zero potential.

The collection device 1 basically comprises two distinct stages, inside the conduit 11, in the upstream to downstream direction, between its inlet orifice 17 and its outlet orifice 18, which stages are arranged one 10 immediately downstream of the other 20.

The first stage is formed by a unipolar ion diffusion charger 10 and is similar to that previously described with reference to FIG. 1.

The charger 10 thus comprises a central electrode that extends along the axis X in the form of a wire 12 connected to a power supply delivering a high voltage adapted to thus create a corona discharge in the vicinity of the wire 12.

It further comprises a peripheral electrode in the form of a gate 14 connected to a low-voltage power supply.

The charger 10 is adapted to charge the nanoparticles in the space 15 separating the gate 14 from the internal wall of the conduit 11 by diffusing unipolar ion through the gate.

The stage 20, downstream of the charger 10, comprises a central field electrode 22, in the form of a solid disk that extends orthogonal to the axis (X), connected to a power supply delivering high voltage, and a flat substrate 24 arranged parallel to the field electrode while defining a space 21.

Advantageously, a single high-voltage power supply allows both the corona effect to be produced in the vicinity of the wire 12 and the field electrode 22 to be fed. The high voltage is preferably selected between 2 and 6 kV, more preferably at approximately 4 kV.

The flat substrate 24 is electrically connected at zero potential and is perforated in its central part with a through opening 240 and comprises various concentric rings 25 around the through opening, which rings are individually connected to an electrometer, not shown. The flat substrate 24 is preferably conductive, typically made of metal, or semi-conductive. Its diameter is preferably between 10 and 25 mm, more preferably approximately 20 mm.

The operation of the collection device previously described with reference to FIG. 2 is as follows.

Air containing the particles to be collected is sucked through the inlet orifice 17 by the action of suction means, not shown. It is evenly distributed in a cylindrical volume inside the conduit 11.

The nanoparticles of the aerosol are electrically charged by unipolar ion diffusion in the space 15 separating the gate 14 from the conduit 11.

These nanoparticles, with high electrical mobility, and the other bigger particles with lower electrical mobility, penetrate the stage 20.

The electric field without a corona effect created in the space 24 by the potential difference applied between the field electrode 22 and the substrate 24 ensures that the nanoparticles previously charged by the diffusion charger are collected by being deposited onto said substrate. More specifically, the finest nanoparticles, with higher electrical mobility, are precipitated toward the periphery of the flat substrate, i.e. on the peripheral rings, the bigger nanoparticles are precipitated toward the center of the flat substrate, i.e. on the rings in the vicinity of the through opening 240.

Particles that are bigger than the nanoparticles for their part are not collected by the substrate 24 but are extracted through the opening 240 toward the outlet orifice 18. Indeed, the operating parameters of the device according to the invention are computed such that all the nanometric particles, i.e. smaller than 100 nm, are deposited onto the flat substrate 24. In other words, all the particles that are bigger than 100 nm are discharged through the opening 240.

By way of an illustration, a 2 cm diameter flat substrate 24 with a 4 mm space 21 relative to the electrode 22, which would be taken to a potential of 4 kV, allows all the nanoparticles to be collected at an aerosol flow rate of 2 l/min.

Signal processing by deconvoluting signals coming from electrometers each connected to one of the concentric rings 25 allows the concentration and the particle size to be obtained for the nanoparticles deposited onto all the rings.

Subsequently, the substrate 24 may be removed from the device 1 according to the invention in order to determine the chemical composition and/or the morphology of the nanoparticles collected on the concentric rings 25.

A laser induced breakdown spectroscopy (LIES) analysis is particularly advantageous, despite the high surface density gradient of the deposited nanoparticles that may exist between the center of the substrate and its periphery.

As shown in FIGS. 2 to 5, there are four concentric rings. The inventors believe that this number is a good compromise between the high possible resolution of the LIBS, which could allow all the concentric rings to be distinguished, and the possible design of the electronics associated with measuring very low currents, so as to make the device according to the invention portable.

FIG. 3 shows an advantageous variant of the device 1 according to the invention. According to this variant, a system 30 is provided for enveloping the aerosol flow between two laminar flows of filtered air. The filtered air advantageously may be the air exiting the outlet orifice 18, which also has been purified of the particles bigger than the nanoparticles collected on the substrate 24.

Therefore, this stage 30 of enveloping the flow comprises a filtered air supply orifice 31 connected to a downstream distributor 32.

As shown in FIG. 3, the filtered air introduced from the orifice 31 feeds the distributor 32, which generates two concentric laminar flows of filtered air, one against the internal wall of the cylindrical conduit 11 and the other against the external wall (gate 14) of the charger 10. Therefore, as shown by the dots, the aerosol flow containing the charged nanoparticles is enveloped between the two laminar flows of filtered air. This allows the resolution of the particle size selection of the nanoparticles to be enhanced.

It is to be noted that, in FIG. 3, no electric field is applied between the electrode 22 and the substrate 24.

The enveloping of the aerosol, as shown in FIG. 3, also provides the best operating conditions for the charger 10, since the residence time of the particles in the ionized space 15 is particularly well controlled in this type of flow (publication [4]).

In practice, the flow of filtered air entering through the orifice 31 advantageously may be selected to have the same order of magnitude as the aerosol flow entering through the orifice 17, which overall provides dilution by a factor of 2.

According to an advantageous embodiment, the device 1 may be produced in order to collect all the particles, even the biggest particles, i.e. those bigger than 100 nm that would not be previously deposited onto the flat substrate 24 due to the excessively low electrical mobility.

Such an embodiment is shown in FIG. 4: a filter 40, advantageously in the form of a flat filter, such as a filtering membrane, is interposed in the conduit 11 downstream of the through opening 240.

This filter 40 is connected to an additional electrometer, not shown, and it is retained by an insulating support 41.

Therefore, it is possible to determine, in real time, the ratio between nanoparticles and particles bigger than 100 nm present in the aerosol.

The filter 40 itself may be analyzed a posteriori to determine the chemical composition of particles that are bigger than 100 nm, and possibly their particle size by image analysis.

Figure 5:
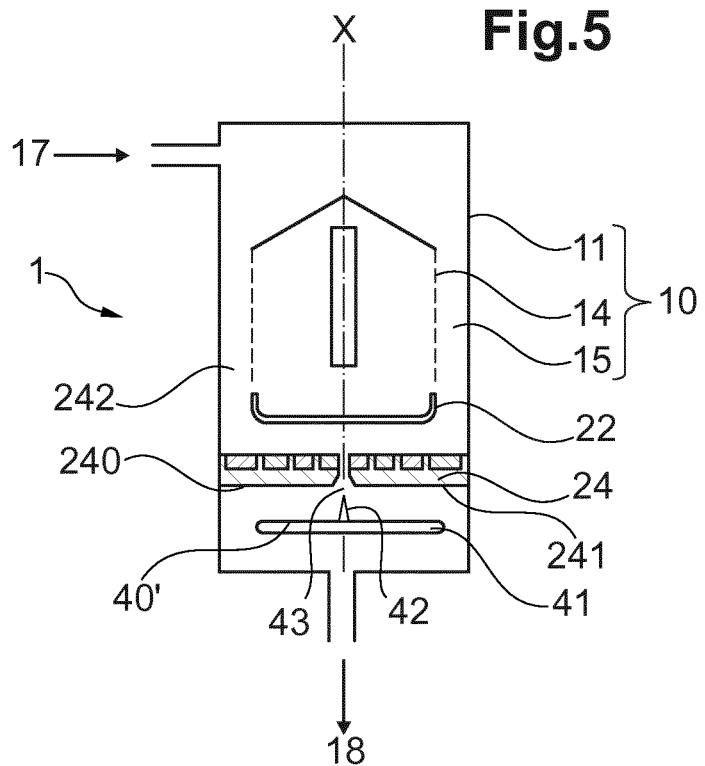
FIG. 5 is a schematic longitudinal section view of an alternative to the advantageous embodiment of the device according to FIG. 4.

An alternative to the embodiment of FIG. 4 is shown in FIG. 5.

Instead of a filter 40, an electrostatic trap 40' may be installed.

This electrostatic trap may consist in a disk 41 supporting a tip 42 connected to a high-voltage power supply to create a corona discharge.

The tip 42 extends along the axis X immediately downstream of the opening 240. The disk 41 advantageously may be taken to the same potential as the tip 42.

With this configuration, particles bigger than 100 nm passing through the opening 240 are electrically charged in the space 43 above the tip 42 and passing through the intense field created by the tip.

The particles that are thus charged are then precipitated on the lower face 241 of the substrate 24 by means of an electric collection field imposed between the substrate 24 and the disk 41 taken, for example, to the same potential as the tip.

The essential advantage of the device shown in FIG. 5 is that the two faces of the substrate 24 may be used for the analysis: the upper face 242 for analyzing nanoparticles, i.e. smaller than 100 nm, the lower face 241 for analyzing particles bigger than 100 nm.

Figure 6:
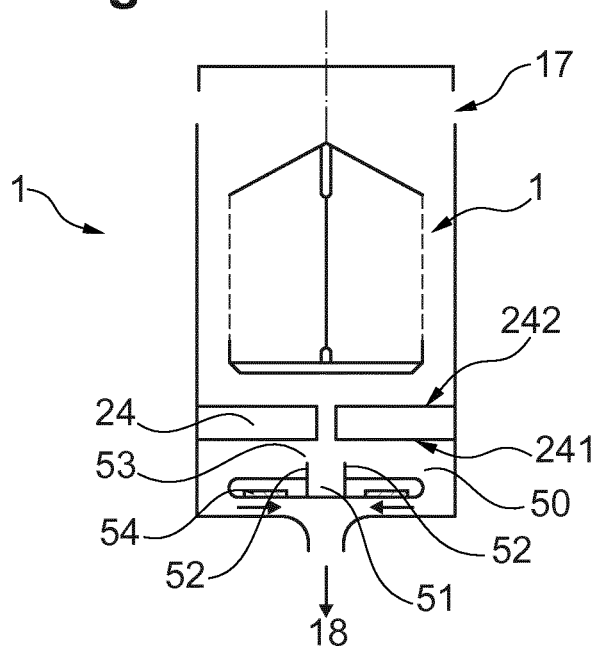
FIG. 6 is a schematic longitudinal section view of another alternative to the advantageous embodiment of the device according to FIG. 4.

FIG. 6 shows another variant of the collection device according to FIG. 3.

In order to collect only part of the particles bigger than 100 nm that are present in the aerosol, a trap 50 is provided in the form of a disk perforated with a blind hole 51 interposed below the opening 240 so as to only allow through the cellular fraction of the particles.

The trap 50 is taken to a high voltage in order to create a corona effect between the lips 52, advantageously of tapered shape, of the blind hole 51 and the lower face 241 of the substrate 24.

Therefore, the particles that are collected are those with a size ranging between 100 nm and the aerodynamic cut-off diameter. By way of an example, in order to have a 4 µm aerodynamic cut-off diameter at a flow rate of 1 l/min, the diameter of the blind hole 51 is approximately 2 mm.

The particles extracted from the trap 50, the particle size of which advantageously is between 0.1 µm and 4 µm, are charged in the space 53 separating the trap 50 from the substrate 24 using a field charging mechanism and are finally collected on the lower face 241 of the substrate 24.

As previously mentioned, the aerosol flow within the device 1 according to the invention may be established by a fan.

In order to particularly avoid noise and vibrations, this fan advantageously may be replaced by one or more plasma actuators, such as those that are shown installed inside the trap 50. These plasma actuators may be of the type of those disclosed in U.S. Pat. No. 6,200,539 B1 and U.S. Pat. No. 8,348,626 B2.

The inventors have simulated the operation of the collection device according to the invention as shown in FIGS. 2 to 6 using finite elements computation software marketed under the name "COMSOL Multiphysics®".

The collection device 1, with the same geometry as that which is shown in FIG. 3, may be studied using the COMSOL finite elements computation software by reviewing the flows, the electric fields and the trajectories of particles.

Figure 7:
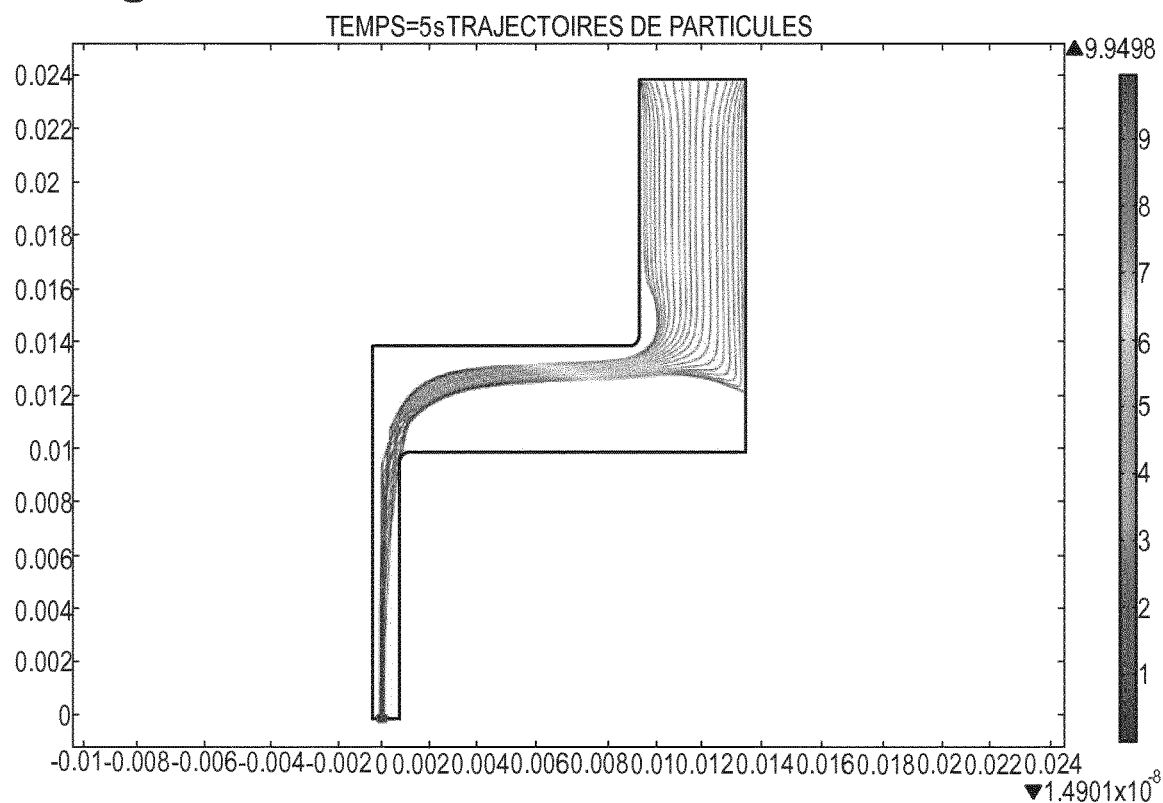
FIG. 7 is a view originating from the simulation by the finite elements computation software for determining the speed profiles of 1 μm particles carrying 50 elementary charges, as well as their trajectories in a device according to the invention as shown in FIG. 3.
Figure 8:
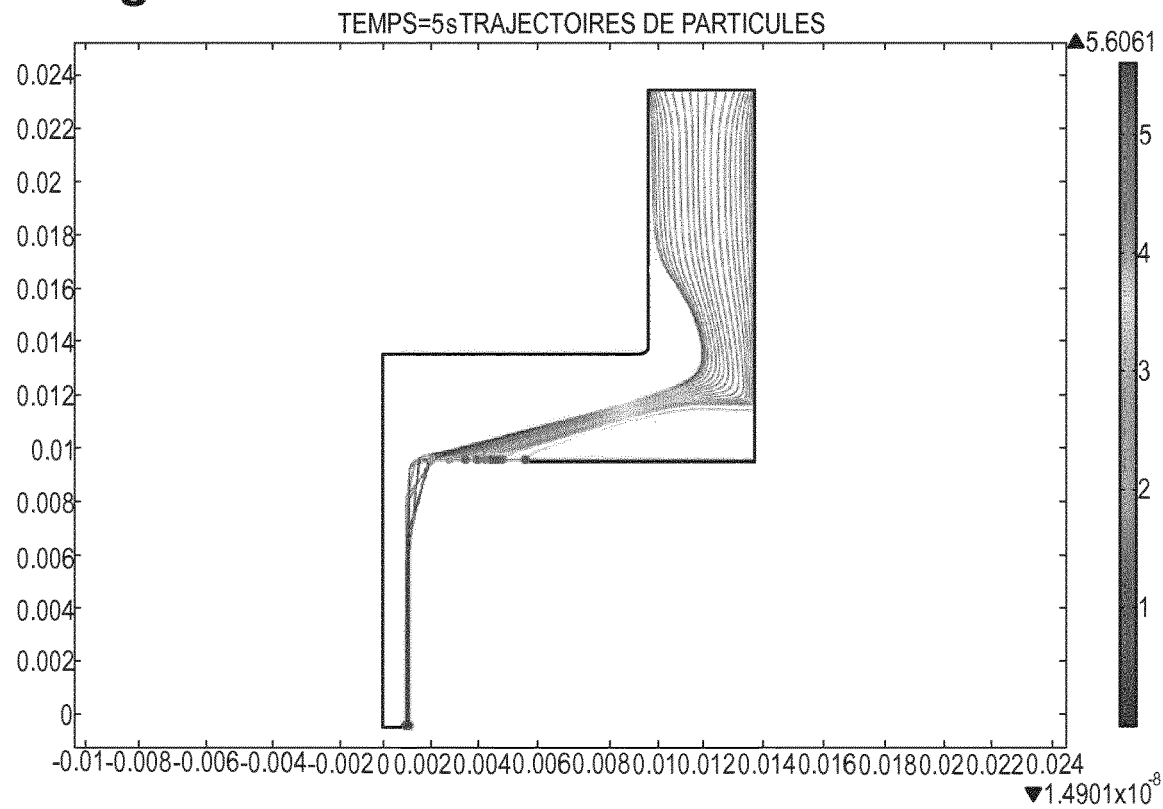
FIG. 8 is a view originating from the simulation by the finite elements computation software for determining the speed profiles of 100 nm particles carrying 4 elementary charges, as well as their trajectories in a device according to the invention as shown in FIG. 3.
Figure 9:
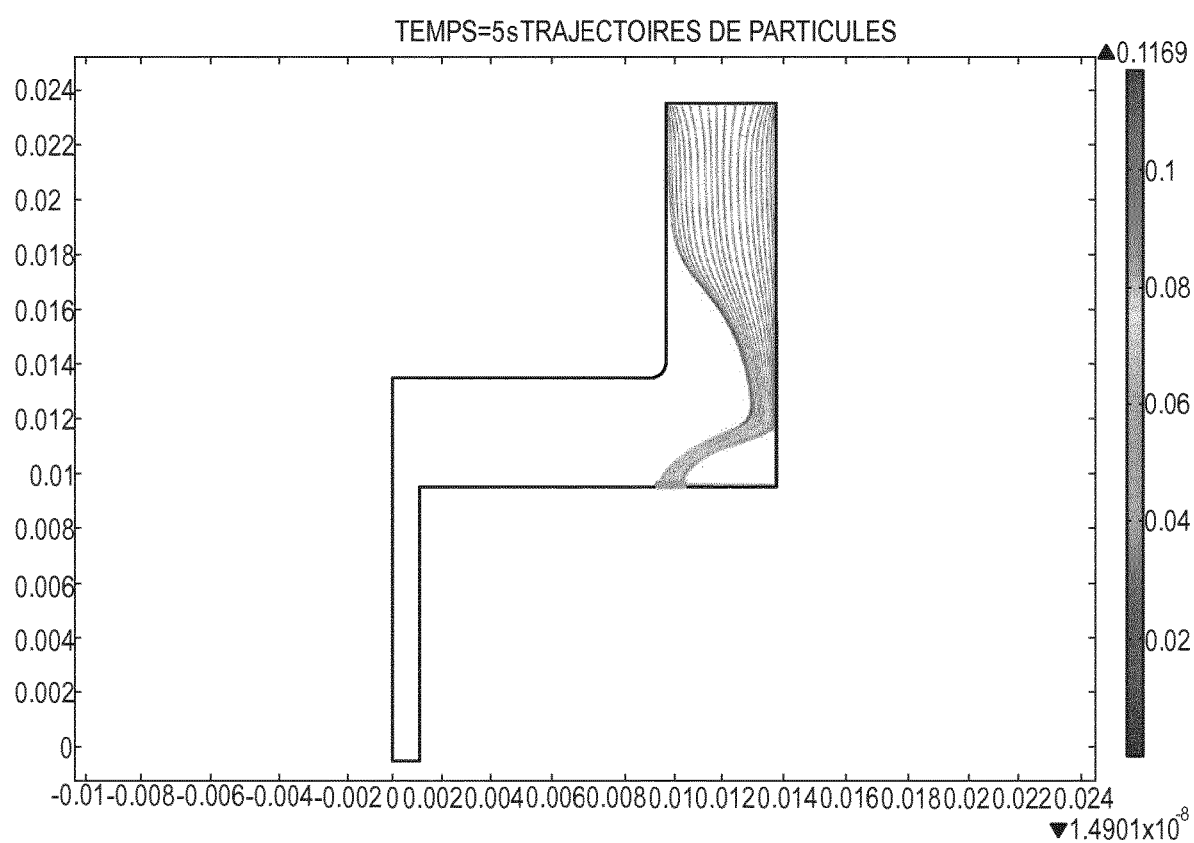
FIG. 9 is a view originating from the simulation by the finite elements computation software for determining the speed profiles of 10 nm particles carrying 1 elementary charge, as well as their trajectories in a device according to the invention as shown in FIG. 3.
Figure 10:
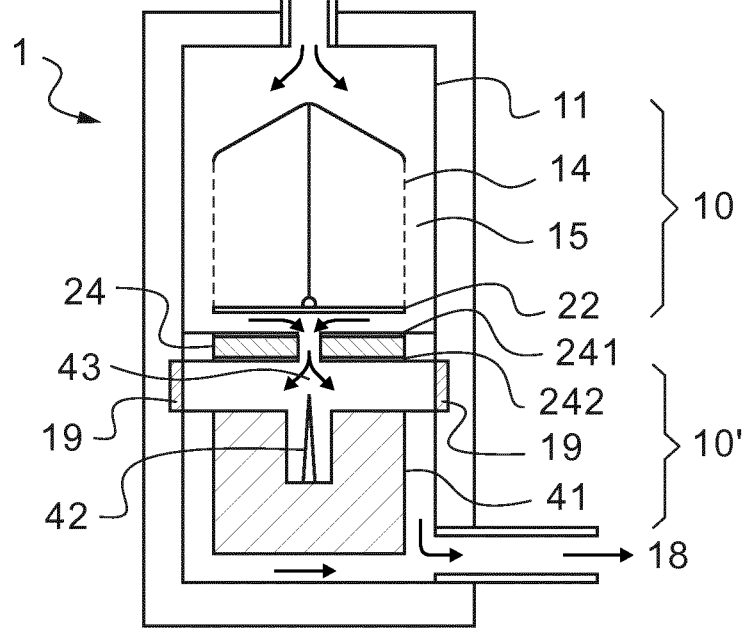
FIG. 10 is a schematic longitudinal section view of another advantageous embodiment of a nanoparticle collection device according to the invention.

FIGS. 7, 8 and 9 are views originating from the simulation by the software for determining the speed profiles of particles, as well as the trajectories of the particles in a device according to the invention as shown in FIG. 3.

The test conditions for each of these FIGS. 7 to 9 are as follows:
 the main aerosol flow rate is 0.5 l/min;
 the filtered air flow rate for enveloping the main aerosol flow is 1 l/min;
 the distance between the plane 22 and the plane 24 is 4 mm;
 the potential applied to the plane 22 is 4 kV.

During simulation tests, the filtered air is introduced in order to envelope the main aerosol flow in the collection space 21.

A first layer of filtered air was introduced at the outer edge of the electrode 22 and a second layer was introduced at the outer edge of the collection surface 24.

Therefore, the aerosol flow containing the charged particles is enveloped between the two laminar flows of filtered air.

FIGS. 7 to 9, which are produced using the "COMSOL Multiphysics" finite elements computation software, show that:
 micron-sized particles all pass through the orifice 240;
 a large proportion of 100 nm particles is collected and a small proportion passes through the orifice 240, which clearly shows the cut-off threshold of the device 1 to be approximately 100 nm;
 10 nm diameter nanoparticles are collected on the outer periphery of the collection disk 24 in the form of a ring.

Therefore, the collection device 1 according to the invention, as shown in FIGS. 2 to 6, allows different sizes of nanoparticles to be collected, by deposition onto the same support, for example a metal disc, in concentric rings corresponding to well-defined particle sizes.

Additional means also may be provided for collecting, downstream of the nanoparticles collection substrate, particles that are bigger than 100 nm, typically micron-sized particles.

FIG. 11 shows a collection device according to another embodiment of the invention.

In this collection device 1, the aerosol to be analyzed penetrates through the inlet orifice 17 and exits through the outlet orifice 18 under the effect of suction caused by an external pump, not shown.

The aerosol is then evenly distributed in a cylindrical volume inside the conduit 11.

A unipolar ion diffusion charger 10 allows the finest particles to be electrically charged in the annular space 15.

The electrode 22 is taken to high voltage while a first collection disk 241, supported by the upper face of an insulating substrate 24, is maintained at zero potential.

The electric field established between the electrode 22 and the disk 241 precipitates the finest particles are precipitated toward the periphery of the disk 241 and the biggest particles toward the center of the disk 241.

A series of electrometers may be arranged on the disk 241 in order to determine the concentration of particles that are deposited thereon in the form of concentric rings.

The biggest particles, which have not been charged by the charger 10 and which have not been precipitated on the disk 241 using the electrode 22, pass through the central hole and are electrically charged in the space 43 by passing through the intense field created by a tip 42 maintained on a support 41 and fed with high voltage in order to create a corona effect.

An electric collection field thus may be established between the second collection disk 242 supported by the lower face of the substrate 24, which is maintained at the potential, and the support 41, which for its part is taken to the same potential as the tip 42.

The device 1 of FIG. 11 may further comprise electrodes 19 taken to high voltage, for example to the same potential as the tip 42. As shown in this FIG. 11, the electrodes 19 are arranged on the periphery of the conduit 11 and extend over the height of the space 43.

These electrodes 19 allow the flow of charged particles to be concentrated toward the collection disk 242, allowing more to be collected with fewer losses outside the collection disk 242.

The particles then may be precipitated on the second collection disk 242, which is physically separated from the first disk 241 by the insulating substrate 24. Instead of the insulating substrate 24, an aerosol transport pipe may be installed.

This physical separation thus defines, in a certain sense, two distinct sub-assemblies, one sub-assembly 10 for charging and collecting the finest particles and one sub-assembly 10' for charging and collecting the biggest particles.

The inventors have also simulated the operation of the collection device of FIG. 11 using the "COMSOL Multiphysics®" software.

In these simulations, numerous geometric and operating parameters were able to be tested.

For each test, the trajectory and the behavior of the particles inside the device were simulated.

The total collection efficiency of the device 1 was able to be measured by counting the number of particles output from the device and the collection efficiency only on the collection disk 241 also was able to be measured.

The lower part of the device 1 shown in FIG. 12 was tested on the basis of the following sizing parameters:
 diameter of the conduit 44;
 diameter of the central hole 46;
 distance between the tip 42 and the collection disk 242;
 diameter of the space 45 around the tip 42;
 voltages applied to the various walls of the device.

The results and the observations of total collection efficiency resulting from the simulation of the device 1 according to FIG. 12, but without electrodes 19, for various particle sizes and with different flow rates, are shown in table 1 below.

Table 2 for its part shows the collection efficiency only on the collection disk 241.

Table 3 shows the ratio between collection only on the collection disk 241 and total collection.

It is to be noted herein that a value of 100 corresponds to a value of 100%.

TABLE 1

| Diameter of the | Suction rate Q through the conduit 18 in l/min | | | |
|---|---|---|---|---|
| particles Dp | 0.25 | 0.5 | 1 | 2.5 |
| 0.2 nm | 70 | 40 | 26 | 14 |
| 0.5 nm | 100 | 74 | 44 | 28 |
| 1 μm | 100 | 100 | 72 | 36 |
| 5 μm | 100 | 100 | 100 | 62 |

TABLE 2

| Diameter of the | Suction rate Q through the conduit 18 in l/min | | | |
|---|---|---|---|---|
| particles Dp | 0.25 | 0.5 | 1 | 2.5 |
| 0.2 nm | 30 | 18 | 8 | 0 |
| 0.5 nm | 62 | 36 | 20 | 0 |
| 1 μm | 66 | 66 | 32 | 10 |
| 5 μm | 8 | 60 | 76 | 12 |

TABLE 3

| Diameter of the | Suction rate Q through the conduit 18 in l/min | | | |
|---|---|---|---|---|
| particles Dp | 0.25 | 0.5 | 1 | 2.5 |
| 0.2 nm | 43 | 45 | 31 | 0 |
| 0.5 nm | 62 | 49 | 45 | 0 |
| 1 μm | 66 | 66 | 44 | 28 |
| 5 μm | 8 | 60 | 76 | 12 |

It is possible to conclude from table 1 that the sub-assembly 10' of the device is best adapted for collecting the biggest particles. Furthermore, it is to be noted that a low flow rate allows better particle collection, which is expressed through a longer residence time for particles in the vicinity of the tip 42 in the case of a low flow rate.

Table 2 shows, i.e. by focusing on the collection efficiencies on the substrate 241 and no longer on the total efficiency of the device, lower collection efficiencies, which supports the conclusion that particle collection does not occur exclusively on the substrate.

In order to improve specific collection on the substrate 241, and to thus avoid particle losses in the device 1, the inventors then proceeded with other simulations by applying different electrical potentials applied to different elements of the device 1.

In a first configuration, as shown in FIG. 13, the tip 42 and the support 41 are taken to a high voltage, typically of approximately 4000 V.

Furthermore, as shown in FIG. 14, the substrate 241, the substrate 241 support and the inlet conduit 44 were together taken to zero potential.

In this first configuration, no electrode is provided on the periphery of the space 43.

An example of a simulation of particle trajectories is shown in FIG. 15.

In FIG. 15 it is to be noted that the particle losses in the device 1 are mostly due to a precipitation of the particles in the central hole 46 of the substrate 241, on the upper face of the substrate and on the substrate 241 support.

In a second configuration, the two electrodes 19 are arranged on the periphery of the conduit 11 over the height of the space 43.

These electrodes 19 promote the collection of particles on the substrate 241 and avoid collection on its support, i.e. on the mechanical parts that link the substrate 241 to the conduit 11.

These electrodes 19 are fed in the same way as the tip 12 and the support 43.

The results and the observations with respect to total collection efficiency resulting from the simulation of the device 1 according to this second configuration, i.e. using electrodes 19, for various particle sizes and with different flow rates, are shown in table 4 below.

Table 5 for its part shows the collection efficiency only on the collection disk 241.

Table 6 shows the ratio between collection only on the collection disk 241 and total collection.

TABLE 4

| Diameter of the | Suction rate Q through the conduit 18 in l/min | | | |
|---|---|---|---|---|
| particles Dp | 0.25 | 0.5 | 1 | 2.5 |
| 0.2 nm | 62 | 32 | 22 | 12 |
| 0.5 nm | 96 | 58 | 36 | 22 |
| 1 μm | 100 | 92 | 54 | 32 |
| 5 μm | 100 | 100 | 100 | 100 |

TABLE 5

| Diameter of the | Suction rate Q through the conduit 18 in l/min | | | |
|---|---|---|---|---|
| particles Dp | 0.25 | 0.5 | 1 | 2.5 |
| 0.2 nm | 38 | 18 | 10 | 0 |
| 0.5 nm | 76 | 42 | 24 | 0 |
| 1 μm | 78 | 74 | 38 | 12 |
| 5 μm | 66 | 84 | 88 | 16 |

TABLE 6

| Diameter of the | Suction rate Q through the conduit 18 in l/min | | | |
|---|---|---|---|---|
| particles Dp | 0.25 | 0.5 | 1 | 2.5 |
| 0.2 nm | 61 | 56 | 45 | 0 |
| 0.5 nm | 79 | 72 | 43 | 0 |
| 1 μm | 78 | 80 | 70 | 38 |
| 5 μm | 66 | 84 | 88 | 23 |

The different results and the efficiency and ratio observations of the simulation of the device 1 in the first configuration without electrodes were then compared, as shown in tables 1 to 3, with the simulation in the second configuration, i.e. using electrodes 19, as shown in tables 4 to 6.

The differences in total efficiency, in efficiency on the substrate 24 only and their ratio between the second configuration and the first configuration are thus respectively summarized in tables 7 to 9.

TABLE 7

| Diameter of the | Suction rate Q through the conduit 18 in l/min | | | |
|---|---|---|---|---|
| particles Dp | 0.25 | 0.5 | 1 | 2.5 |
| 0.2 nm | −8 | −8 | −4 | −2 |
| 0.5 nm | −4 | −16 | −8 | −6 |
| 1 µm | 0 | −8 | −18 | −4 |
| 5 µm | 0 | 0 | 0 | 38 |

TABLE 8

| Diameter of the | Suction rate Q through the conduit 18 in l/min | | | |
|---|---|---|---|---|
| particles Dp | 0.25 | 0.5 | 1 | 2.5 |
| 0.2 nm | 8 | 0 | 2 | 0 |
| 0.5 nm | 14 | 6 | 4 | 0 |
| 1 µm | 12 | 8 | 6 | 2 |
| 5 µm | 58 | 24 | 12 | 4 |

TABLE 9

| Diameter of the | Suction rate Q through the conduit 18 in l/min | | | |
|---|---|---|---|---|
| particles Dp | 0.25 | 0.5 | 1 | 2.5 |
| 0.2 nm | 18 | 11 | 15 | 0 |
| 0.5 nm | 17 | 24 | −3 | 0 |
| 1 µm | 12 | 14 | 26 | 10 |
| 5 µm | 58 | 24 | 12 | 11 |

Table 7 shows that total collection is generally less efficient with the second configuration, with a lower extreme value of −18%. This may be explained by the fact that, in this second configuration, the zones subject to zero potential (potential collection zones) are more limited than in the first configuration.

However, collection is considerably more targeted on the substrate 241 in the second configuration, as can be seen from tables 8 and 9.

To conclude, with the second configuration according to the invention, general collection efficiency of more than 90% is obtained for the biggest particles (1 µm, 5 µm, which will be mainly charged by the lower part of the device 1) and for a low flow rate, for example, 0.5 l·min$^{-1}$, with more than 80% of particles being collected on the substrate 241, whereas only 60% are collected in the first configuration.

In other words, with the second configuration of the invention, i.e. with electrodes 19 on the periphery, the collection selectivity on the substrate is increased and a maximum amount of losses on the walls is avoided.

The support then may be extracted from the rest of the collection device and then analyzed using conventional for physical or physico-chemical characterization techniques (optical or electron microscopy, surface scanner, X-ray fluorescence, laser induced breakdown spectroscopy LIBS, etc.).

The collection device according to the invention is particularly well adapted for sampling nanoparticles in gaseous environments, particularly the air in premises or in the environment, in order to determine the concentration, the particle size, the chemical composition and/or the morphology of the aerosol particles that are likely to be inhaled. Due to its compact design and its reduced electrical consumption, this device may be portable and thus deployed on a large scale for a moderate cost.

Other variants and improvements may be implemented without necessarily departing from the scope of the invention.

The invention is not limited to the aforementioned examples; in particular, features of the illustrated examples may be combined in variants that have not been illustrated.

CITED REFERENCES

[1]: W. Hinds, "*Aerosol Technology*", 2$^{nd}$ Edition, 1999.
[2]: P. Intra and N. Tippayawong, "*Aerosol an Air Quality Research*", 11: 187-209, 2011.
[3]: G. W. Hewitt, "*The Charging of Small Particles for Electrostatic Precipitation*", AIEE Trans., 76: 300-306, 1957.
[4]: G. Biskos, K. Reavell, N. Collings, "*Electrostatic Characterization of Corona-Wire Aerosol Chargers*", J. Electrostat., 63: 69-82, 2005.
[5]: D. Y. H. Pui, S. Fruin, P. H. McMurry, "*Unipolar Diffusion Charging of Ultrafine Aerosols*", Aerosol Sciences Technology, 8: 173-187, 1988.

The invention claimed is:

1. A device for collecting nanoparticles likely to be present in an aerosol, comprising:
   a conduit in the form of a hollow cylinder for rotating about a longitudinal axis (X), the conduit comprising an inlet orifice and an outlet orifice, between which the aerosol may circulate;
   suction means for circulating the aerosol from the inlet orifice to the outlet orifice;
   a unipolar ion diffusion charger, downstream of the inlet orifice, comprising an electrode in the form of a wire that extends along the axis (X) and is surrounded by an electrode in the form of a gate, the charger being adapted to charge the nanoparticles in the space separating the gate from a conducting portion of the internal wall of the conduit by diffusing unipolar ion through the gate;
   a field electrode, downstream of the diffusion charger, which electrode is in the form of a circular plate that extends orthogonal to the axis (X), and at least one flat substrate, parallel to the field electrode, perforated in its central part with a through opening, and comprising various concentric rings around the through opening individually connected to at least one electrometer;
   the potential difference applied between the field electrode and the substrate being adapted to generate an electric field without a corona effect in the space that separates them and thus, on the one hand, to allow particles bigger than nanoparticles to pass through the through opening and, on the other hand, to collect the nanoparticles previously charged by the diffusion charger by deposition onto a collection zone of the flat substrate defined by the various rings.

2. The collection device as claimed in claim 1, further comprising a system adapted to allow the aerosol flow circulating in the space separating the gate from the internal wall of the conduit to be enveloped between two laminar flows of filtered air.

3. The collection device as claimed in claim 1, further comprising, downstream of the through opening of the collection substrate, a filter adapted to retain the particles having passed through the through opening, the filter being able to be connected to an electrometer.

4. The collection device as claimed in claim 1 comprising, downstream of the through opening of the collection substrate, an element consisting in a disk supporting a tip connected to a high-voltage power supply for creating a corona discharge, so as to collect, on the lower face of the substrate, the particles having passed through the through opening, by means of an electric collection field imposed between the substrate and the disk.

5. The collection device as claimed in claim 1, comprising, downstream of the through opening of the collection substrate, a trap in the form of a disk perforated with a blind hole interposed below the opening, so as to collect by inertial impaction, according to a given size range, part of the particles having passed through the through opening.

6. The collection device as claimed in claim 5, wherein the blind hole comprises lips in the form of a tip, the disk being connected to a high-voltage power supply to create a corona discharge in the space between the lower face of the substrate and the lips of the blind hole so as to collect, according to a given size range, only part of the particles having passed through the through opening, preferably particles with dimensions between 0.1 and 4 µm.

7. The collection device as claimed in claim 5, comprising an additional element, the disk being connected to a high-voltage power supply for creating a corona discharge in the space between the lower face or the upper face of the substrate and the additional element, so as to collect, according to a given size range, only part of the particles having passed through the through opening.

8. The collection device as claimed in claim 1, the suction means being formed by a pump or a fan.

9. The collection device as claimed in claim 1, the suction means being at least partly formed by plasma actuators.

10. The collection device as claimed in claim 1, the field electrode being connected to a high-voltage power supply.

11. The collection device as claimed in claim 1, the gate being connected to a low-voltage power supply.

12. The collection device as claimed in claim 1, the flat substrate being connected to zero potential.

13. A method for operating a collection device as claimed in claim 1, comprising a step of emitting an alarm in the event that a predetermined threshold value is exceeded that is measured using the one or more electrometer(s) connected to the concentric rings integrated in the collection substrate.

14. The collection device according to claim 7, the additional element being a blade or a wire in the form of a tip.

* * * * *

UNITED STATES PATENT AND TRADEMARK OFFICE
CERTIFICATE OF CORRECTION

PATENT NO. : 10,675,639 B2
APPLICATION NO. : 15/744291
DATED : June 9, 2020
INVENTOR(S) : Simon Clavaguera, Michel Pourprix and Quentin Renot It is certified that error appears in the above-identified patent and that said Letters Patent is hereby corrected as shown below:

In the Specification

Column 5, Line 36, "µ-XRF, LIES and even" should read -- µ-XRF, LIBS and even --;

Column 5, Line 48, "such as LIES, the" should read -- such as LIBS, the --;

Column 5, Line 50, "that an LIES technique" should read -- that an LIBS technique --;

Column 5, Lines 66, "standard LIES analysis" should read -- standard LIBS analysis --;

Column 9, Line 47, "spectroscopy (LIES) analysis" should read -- spectroscopy (LIBS) analysis --.

Signed and Sealed this
Fifteenth Day of September, 2020

Andrei Iancu
*Director of the United States Patent and Trademark Office*